United States Patent
Hurtado et al.

(10) Patent No.: US 7,502,205 B1
(45) Date of Patent: Mar. 10, 2009

(54) METHOD OF OPERATING READ AND WRITE TRANSDUCERS BY CONTROLLING THERMAL ACTUATION

(75) Inventors: Tony Hurtado, Cupertino, CA (US); Wentao Yan, Fremont, CA (US); Lin Guo, Saratoga, CA (US); Chris Hawks, Saratoga, CA (US); Don Brunnett, Pleasanton, CA (US); Thao Nguyen, San Jose, CA (US); Richard Oswald, San Jose, CA (US); Erhard Schreck, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 391 days.

(21) Appl. No.: 10/859,919

(22) Filed: Jun. 3, 2004

Related U.S. Application Data (60) Provisional application No. 60/476,130, filed on Jun. 5, 2003.

(51) Int. Cl.
G11B 21/02 (2006.01)
G11B 5/55 (2006.01)

(52) U.S. Cl. ............... 360/294.7; 360/75; 360/125.31; 360/125.74

(58) Field of Classification Search .......... 360/294.7, 360/234.4, 234.7, 235.7, 236.5, 75, 125.31, 360/125.74, 234.5
See application file for complete search history.

(56) References Cited

U.S. PATENT DOCUMENTS

| | | | | |
|---|---|---|---|---|
| 4,796,127 A | * | 1/1989 | Wada et al. ............... 360/235.3 |
| 4,814,915 A | * | 3/1989 | Wada et al. ............... 360/85 |
| 5,525,874 A | * | 6/1996 | Mallarapu et al. ......... 318/254 |
| 5,991,113 A | * | 11/1999 | Meyer et al. ............... 360/75 |
| 6,104,577 A | * | 8/2000 | Kato et al. ................ 360/46 |
| 6,195,219 B1 | * | 2/2001 | Smith ...................... 360/66 |
| 6,277,506 B1 | * | 8/2001 | Okamoto .................. 428/701 |
| 6,317,862 B1 | * | 11/2001 | Dolan, Jr. et al. ............ 716/8 |
| 6,950,266 B1 | * | 9/2005 | McCaslin et al. ............ 360/75 |
| 7,330,324 B2 | * | 2/2008 | Morinaga et al. ............ 360/59 |
| 7,426,090 B2 | * | 9/2008 | Yamashita et al. .......... 360/75 |
| 7,430,090 B2 | * | 9/2008 | Oyamada et al. ............ 360/75 |
| 7,436,620 B1 | * | 10/2008 | Kang et al. ................. 360/75 |
| 2003/0099054 A1 | * | 5/2003 | Kamijima ................. 360/59 |
| 2003/0174430 A1 | * | 9/2003 | Takahashi et al. ........... 360/75 |
| 2004/0114268 A1 | * | 6/2004 | Satoh et al. ................ 360/75 |
| 2005/0024775 A1 | * | 2/2005 | Kurita et al. .............. 360/234.3 |
| 2007/0006446 A1 | * | 1/2007 | Wang et al. .............. 29/603.03 |
| 2008/0170321 A1 | * | 7/2008 | Shimozato ................. 360/75 |

OTHER PUBLICATIONS

"An Active Slider for Practical Contact Recording" Yeack-Scranton, Khanna, Etzold, Praino, IEEE Transactions on Magnetics, vol. 26, No. 5,Sep. 1990; pp. 2478-2483.

\* cited by examiner

*Primary Examiner*—Brian E Miller
(74) *Attorney, Agent, or Firm*—Foley & Lardner LLP (57) ABSTRACT

A control source and drivers for a thermal actuator fly height controlled heads in a disk drive system includes provisions for driving a heater element to dissipate various levels of power, and thus actuate the head by a desired amount, depending on whether the head is in a write mode or a read mode. Further, overshoot and undershoot are achieved as desired by providing initial values and equilibrium values and through the use of a control capacitor to provide a time constant to the drive signal to the heater element.

10 Claims, 7 Drawing Sheets

METHOD OF OPERATING READ AND WRITE TRANSDUCERS BY CONTROLLING THERMAL ACTUATION

CROSS-REFERENCE TO RELATED APPLICATIONS

This application claims priority from U.S. Provisional Patent Application No. 60/476,130, filed Jun. 5, 2003, entitled "Control and Drivers for Thermal Actuator Fly Height Controlled Heads", the contents of which are incorporated herein by reference.

FIELD OF THE INVENTION

This application relates to techniques for causing the transducer portion of a read/write head to fly at a controlled elevation relative to the adjacent media, and more particularly to controlling a thermal actuator to achieve that effect.

BACKGROUND OF THE INVENTION

In hard disk drives, data is written to and read from magnetic recording media, herein called disks, utilizing magnetoresistive (MR) transducers commonly referred to as MR heads. Typically, one or more disks having a thin film of magnetic material coated thereon are rotatably mounted on a spindle. An MR head mounted on an actuator arm is positioned in close proximity to the disk surface to write data to and read data from the disk surface.

During operation of the disk drive, the actuator arm moves the MR head to the desired radial position on the surface of the rotating disk where the MR head electromagnetically writes data to the disk and senses magnetic field signal changes to read data from the disk. Usually, the MR head is integrally mounted in a carrier or support referred to as a slider. The slider generally serves to mechanically support the MR head and any electrical connections between the MR head and the disk drive. The slider is aerodynamically shaped, which allows it to fly over and maintain a uniform distance from the surface of the rotating disk.

Typically, an MR head includes an MR read element to read recorded data from the disk and an inductive write element to write the data to the disk. The read element includes a thin layer of magnetoresistive sensor stripe sandwiched between two magnetic shields that are electrically connected together but are otherwise isolated. The shields are constructed so that one is just upstream of the sensor stripe and one is just downstream of the sensor stripe. A constant current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

Earlier MR sensors operated on the basis of the anisotropic magnetoresistive (AMR) effect in which a component of the read element resistance varied as the square of the cosine of the angle between the magnetization and the direction of sense current flowing through the read element. In this manner, because the magnetic field of the recording media would effect the magnetization direction within the read element, the change in resistance could be monitored to determine the type of external magnetic field applied by the magnetic recording medium. Most current disk drive products utilize a different, more pronounced magnetoresistive effect known as the GMR or spin valve effect. This effect utilizes a layered magnetic sensor that also has a change in resistance based on the application of an external magnetic field.

Competitive pressures drive the need to increase areal density in each new product generation. Increased areal density for longitudinal magnetic recording is facilitated by smaller magnetic spacing between the read/write transducer and the recording media, because of the higher signal strength and resolution that lower spacing provides. Conventionally, lower magnetic spacing is achieved by reducing the dimension of every material intervening between the transducer and media, including media carbon overcoat, head overcoat, and air bearing. The pressure for lower magnetic spacing has been especially demanding on air bearing technology to produce large populations of heads with narrow distributions in flying attitude and little variance in fly height when accessing different data tracks.

One phenomenon that affects how closely heads can be flown to the disk is write pole tip protrusion (WPTP). This is when the portion of the ABS in the region of the write transducer protrudes toward the disk due to the thermal expansion of materials in the head due to the higher temperatures experienced by those materials during writing operations. Because of this protrusion, prior art heads needed to be spaced apart from the disk by at least this amount so that when WPTP occurred there would be no contact between the head and the disk.

It is against this background and a desire to improve on the prior art that the present invention has been developed.

SUMMARY OF THE INVENTION

In view of the foregoing, a broad objective of the present invention is to reduce magnetic spacing between read/write heads and adjacent media. It is also an objective of the present invention to maintain this reduced spacing during both reading and writing operations.

In carrying out these and other objectives, features, and advantages of the present invention, a read/write head with magnetic transducers therein for use in writing data to and reading data from an adjacent data storage disk in a disk drive system is provided. The head includes a body, a read transducer located in the body and having a portion thereof positioned along an air bearing surface (ABS), a write transducer located in the body and having a portion thereof positioned along the ABS, a thermal actuator located in the body to cause at least portions of the ABS to move closer to the adjacent storage disk, and a control device for the thermal actuator that provides for different levels of thermal actuation under various conditions.

The control device may provide for different levels of thermal actuation depending upon whether the disk drive is performing a read operation or a write operation. The different levels of thermal actuation may be achieved by causing the thermal actuator to dissipate different levels of power. The different levels of power may be achieved by controlling the current provided to the thermal actuator or by controlling the voltage applied to the thermal actuator. The control device may include a current source driver, a voltage source driver, or a hybrid driver having a feedback element.

The control device may include a device for selecting one of multiple inputs to the driver based on a current operational mode of the disk drive system. The selecting device may include a multiplexer. There may be at least two selectable inputs, one for a read mode and one for a write mode of the disk drive system. The input for the read mode may include an initial value and an equilibrium value and may begin at the initial value and settle over time to the equilibrium value. The selecting device may also include a control capacitor that initially stores the initial value. The selecting device may also include at least one controllable current source to remove charge from the control capacitor. The controllable current source may be controlled by a signal that determines the time constant of the settling over time to the equilibrium value The input for the write mode may include an initial value and an equilibrium value, beginning at the initial value and settling over time to the equilibrium value. The selecting device may also include a control capacitor that initially stores the initial value. The selecting device may also include at least one controllable current source to remove charge from the control capacitor. The controllable current source may be controlled by a signal that determines the time constant of the settling over time to the equilibrium value.

The thermal actuator may include a resistive heater. The control device may approximate a continuously variable amount of actuation by the thermal actuator by driving the thermal actuator with a series of step responses.

Another aspect of the present invention relates to a method of operating read and write transducers in a disk drive system. The method includes providing a read/write head and an adjacent data storage disk for a disk drive system, the head having a read transducer, a write transducer, and a thermal actuator located therein; driving the thermal actuator with electrical current to heat up the thermal actuator and portions of the head so that at least portions of the head expands and a distance between the head and the adjacent storage disk decreases; and controlling the thermal actuator for different levels of thermal actuation under various conditions.

Another aspect of the present invention relates to a read/write head with magnetic transducers therein for use in writing data to and reading data from an adjacent data storage disk in a disk drive system. The head includes a read/write head with a read transducer and a write transducer, the head having an ABS; a thermal actuator located in the head to cause at least portions of the ABS to move closer to the adjacent storage disk; and a control device for the thermal actuator that provides for different levels of thermal actuation under various conditions.

Another aspect of the present invention relates to a read/write head with magnetic transducers therein for use in writing data to and reading data from an adjacent data storage disk in a disk drive system. The head includes a read/write head having an ABS; a thermal actuator located in the head to cause at least portions of the ABS to selectably move closer to the adjacent storage disk; and a control device for the thermal actuator that provides for different levels of thermal actuation under various conditions.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention might be applicable to other applications where it is required or desired to control a thermal actuator used to control the relative spacing of two objects. In this regard, the following description of a read/write head in a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
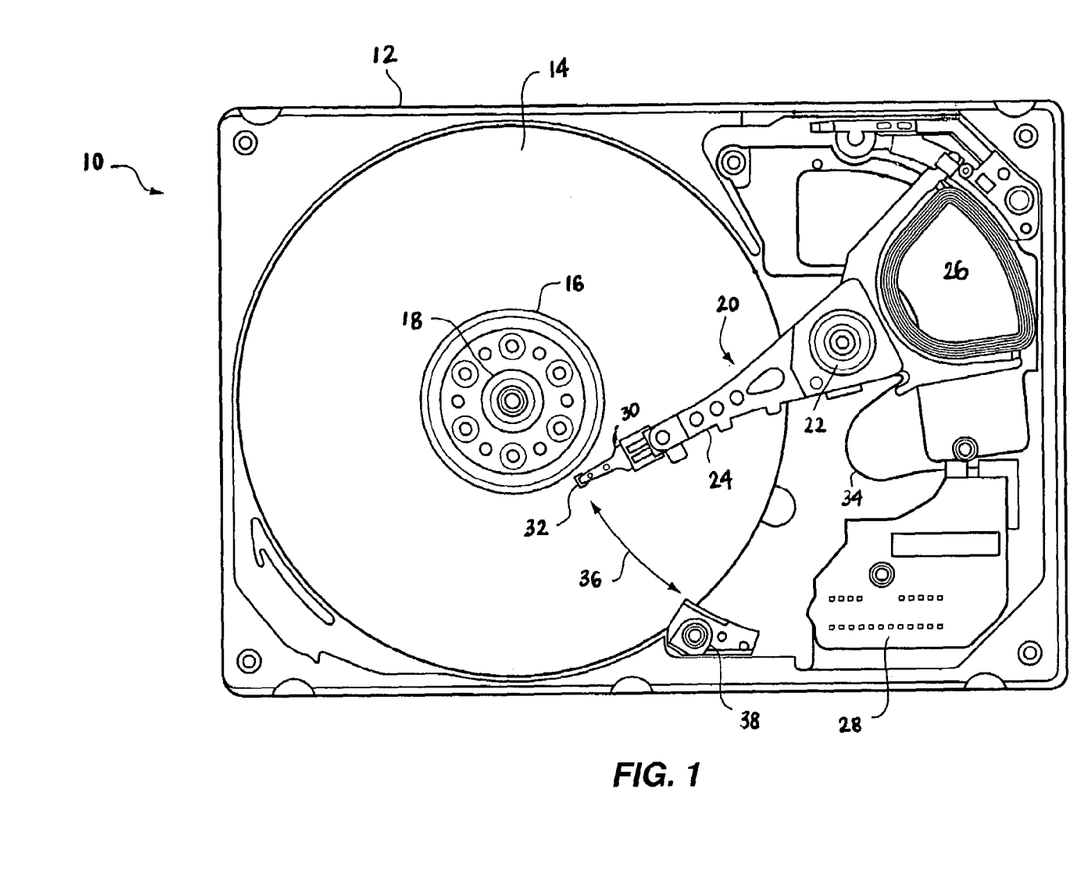
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read/write technologies such as anisotropic magnetoresistive (AMR), giant magnetoresistive (GMR), and tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two magnetic layers (or more). The typical use in recording heads is the spin valve device that uses a free layer to detect external fields, and a pinned magnetic layer. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by an insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14.

Terminating the rotation of the data storage disk(s) 14 in this type of disk drive configuration would then result in the slider(s) 32 actually establishing contact with or "landing" on their corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
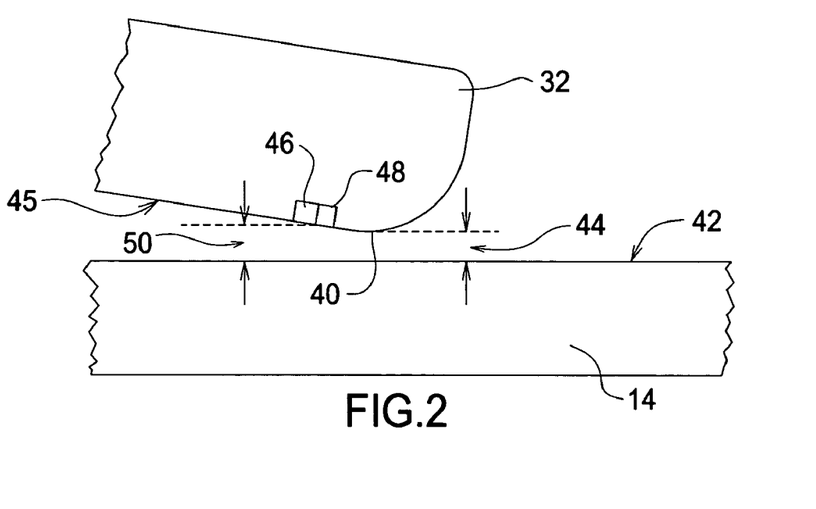
FIG. 2 is a side view of a read/write head on a slider that is spaced apart from an adjacent magnetic storage disk such as may be found in the disk drive system of FIG. 1.

A close-up side view of the trailing edge of the slider 32 is shown in FIG. 2. It can be seen in FIG. 2 that a trailing edge 40 of the slider 32 is the closest portion of the slider 32 to the adjacent storage disk 14. The distance from a top surface 42 of the disk 14 to the closest point on the slider 32 is known as the minimum fly height 44. A distance from the top surface 42 of the disk 14 to the portion of the air-bearing surface (ABS) 45 corresponding to the locations of a read transducer 46 and a write transducer 48 is known as the gap fly height 50.

Figure 3:
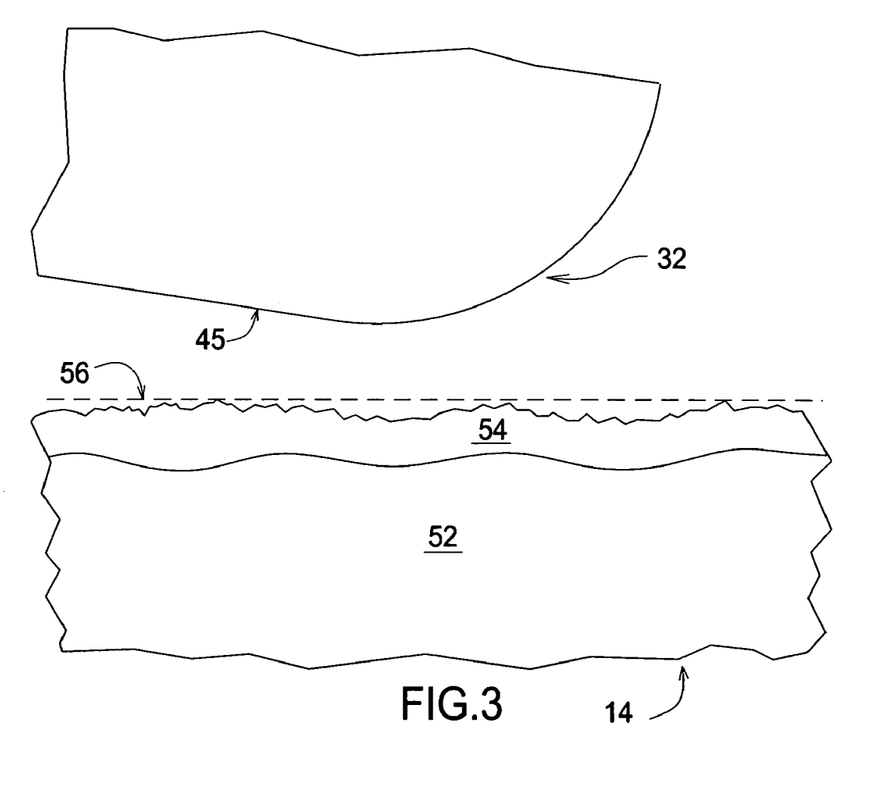
FIG. 3 is a magnified side view of the read/write head and adjacent magnetic storage disk of FIG. 1 showing some surface texture in the upper surfaces of the disk.

Further detail can be seen in FIG. 3 in which it can be appreciated that the disk 14 may include several layers, the upper layers of which include a media layer 52 and a conformal overcoat and lubricant layer 54. Because of variations on the surface of the media layer 52 and the conformal overcoat layer 54, the top surface of the conformal overcoat layer 54 can be defined by a horizontal plane 56 passing through the highest point on the conformal overcoat layer 54.

Figure 4:
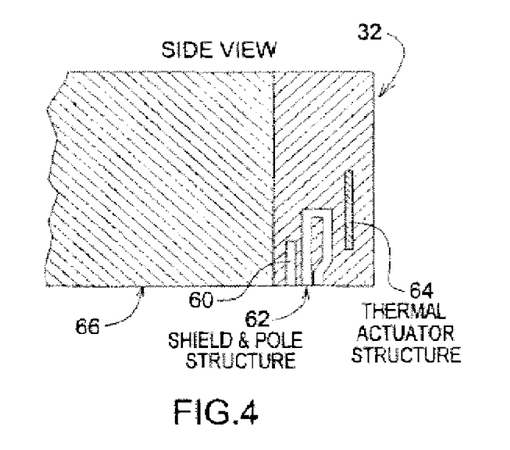
FIG. 4 is a schematic side view of a read/write head of the present invention.

A schematic view of the end of the slider 32 of the present invention is shown in FIG. 4. In this case, the illustrated portions of the read transducer 46 and write transducer 48 are a read shield 60 and a write shield/pole structure 62. A thermal actuator or heater 64 is also located in the slider 32 adjacent to the write shield/pole structure 62 and displaced above an ABS 66 of the slider 32.

Figure 5:
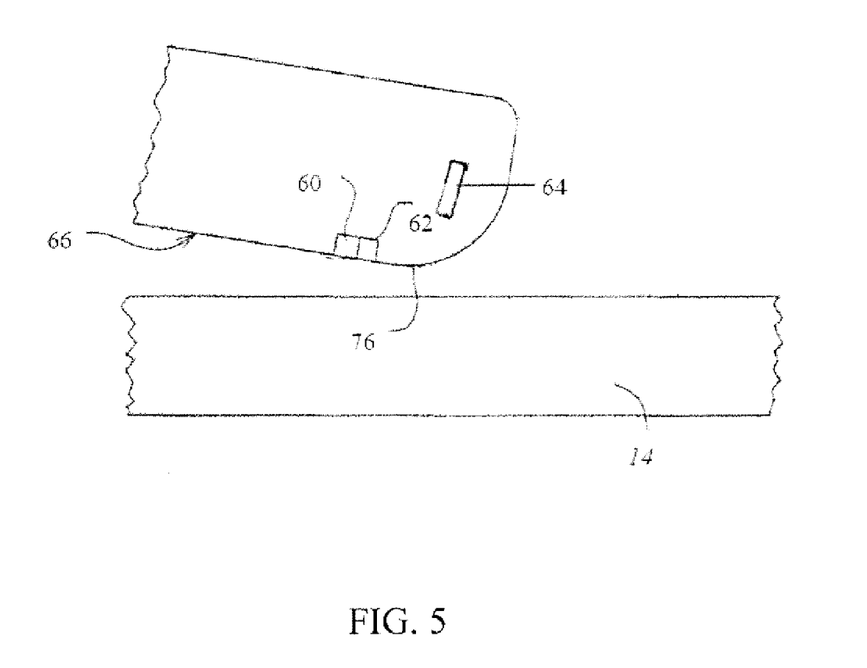
FIG. 5 is a view similar to FIG. 3, showing the ABS of the head in an actuated position due to the actuation of the heater.

As can be seen in FIG. 5, when the heater 64 is actuated, the portion of the slider in the vicinity thereof (including the portion containing the read/write transducers) expands due to the heat produced by actuating the heater 64. This expansion causes the ABS in the vicinity of the heater 64 to distort in a controlled manner so as to be closer to the disk surface. In this manner, the minimum fly height and the gap fly height can be controlled and made small when desired. At other times, the minimum fly height and the gap fly height can be left at a greater stand off distance to reduce the likelihood of contact with the disk surface.

Once the transducers are positioned closer to the disk surface by this actuation, the disk drive system is capable of higher (frequency) performance reading and writing. It should be emphasized, however, that even in the non-actuated or retracted position, the read transducer could still be utilized to read the relatively-lower frequency servo pattern.

Of course, a driver and control source are required to drive and control the thermal actuator or heater 64. Assuming that fly height is reduced proportionally with the power that is dissipated in the heater 64, the control source will modulate the fly height by appropriately metering power delivered to the heater 64. Since write pole tip protrusion (WPTP) occurs during writing operations, less power will be needed during writing because the effective fly height is reduced without the aid of the heater 64. Conversely, during read operations, a higher amount of applied power will be required in order to achieve the nominal read mode fly height operating point. Power applied to the heater 64 during transition from mode to mode may also be tailored so as to compensate for the fly height dynamics and the associated time constants encountered in transition. Controls and drivers to effect this application of power to the heater 64 are detailed below.

Figure 6:
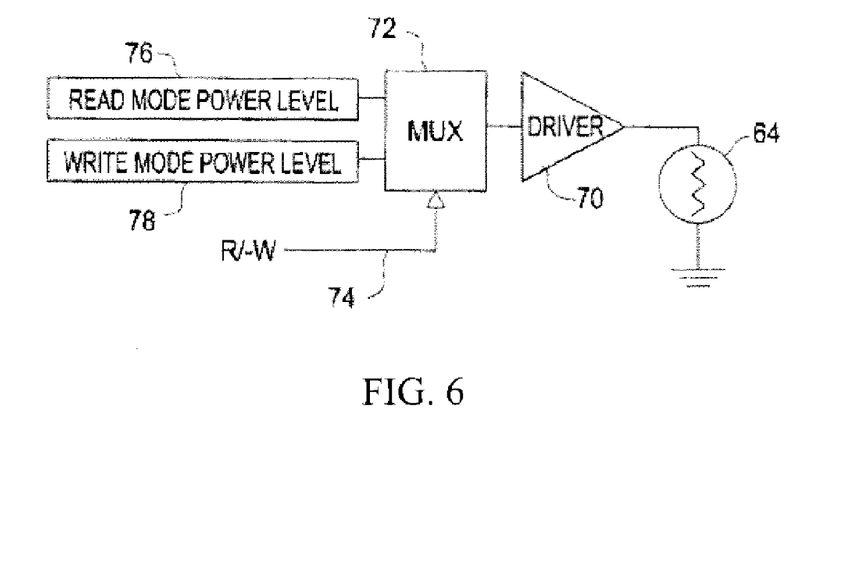
FIG. 6 is a block diagram of a control source and driver of the present invention.

As stated above, different power levels must be available for read and write modes and these levels are preferably programmable. Transition between the write and read mode power levels can be controlled by a signal sent from the Hard Disk Drive Controller ASIC that is commonly known as the write gate or R/-W signal. The block diagram in FIG. 6 illustrates this arrangement. As can be seen, the heater 64 is driven by a driver 70 that receives a signal from a multiplexer 72. The multiplexer 72 is controlled by the R/-W signal 74 to provide one of two input signals as an output signal which is provided to the driver 70. The input signals are the read mode power level 76 and the write mode power level signal 78. These two power level signals 76 and 78 may come from register settings in memory in the disk drive 10.

The driver 70 can take several forms: a current source driver, a voltage source driver, or a hybrid or power driver. Due to the fact that the heater 64 will possibly increase in resistance as a function of its temperature (which in turn is a function of the power dissipated in the heater), each driver will have slightly different results. For the current source driver, there is a change in power due to a change in resistance over temperature. In other words, the power increases linearly with increasing resistance and therefore, with increasing temperature. Considering that the onset of pole tip protrusion is not instantaneous (because of a heating time constant associated with the onset of this phenomenon), the increase in delivered power as temperature increases can be counter-productive. If, however, materials for the heater 64 have a low temperature coefficient of resistance (low TCR), than this negative characteristic is minimized. Moreover, this type of driver may be the simplest circuit in terms of number of circuit elements and thus the lowest cost solution.

In the case of a voltage source driver, the power delivered to the heater 64 will initially be high, but will drop in proportion to 1/R as the resistance increases (since power is $V^2/R$). Therefore, this type of driver gives the beneficial decay of delivered power as a function of heater resistance. In the event that some proportionality to pole tip protrusion is desired, such a response is provided for here as the delivered power drops as the resistance (and also the temperature in higher TCR materials) increases. This type of driver is slightly more complicated to realize in circuit elements and thus will be slightly more expensive to construct than the current source driver.

A hybrid driver could be designed to incorporate feedback based on either current draw or delivered voltage. This has the benefit of delivering power to the heater 64 as specified by the control source and is insensitive to the temperature of the heater 64. By virtue of this, the power delivered to the heater 64 can be specified fully by the controller and also tailored to a desired response versus time, independent of temperature effects. This driver is thus independent of heater resistance and temperature, and thereby lacks any sensitivity to temperature that could otherwise be useful as self-adjustment in compensation of PTP. However, due to the complexity of adding a feedback term to the circuitry, this driver type is the most complicated design of the three types and therefore carries the highest cost.

Another approach in control/driver design is to provide adjustment of delivered driver power as a function of time in compensation of both pole tip protrusion and heater resistance changes. Both pole tip protrusion and changes in heater resistance have time constants associated with them that, taken together, could be compensated for by the controller with an adjustment in the amount of current or voltage applied to the element versus time. The outcome of this is a control that varies the amount of power delivered to the element over time. Such an approach is illustrated in FIG. 7.

Figure 7:
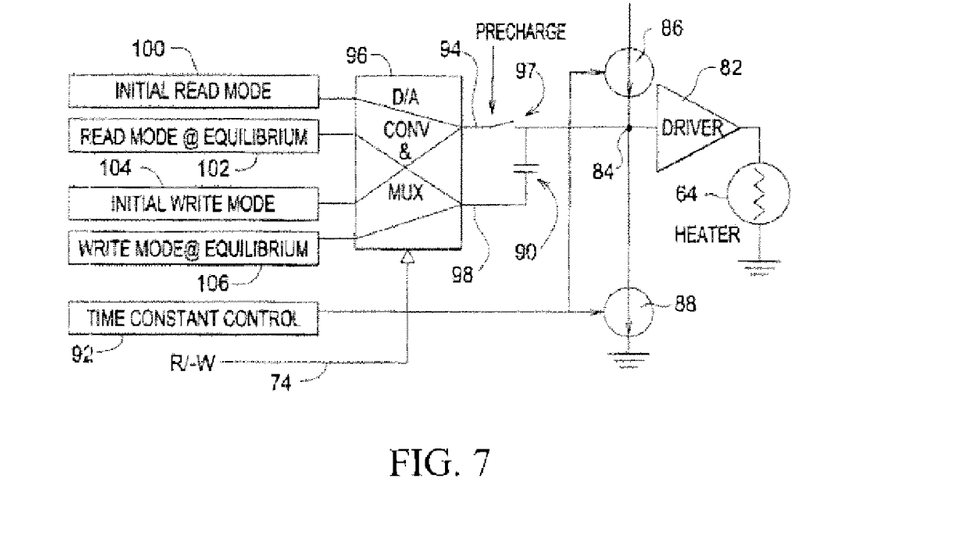
FIG. 7 is a block diagram of another control source and driver of the present invention.

In FIG. 7, the heater 64 is driven by a driver 82 whose input comes from a node 84 located between first and second controllable current sources 86 and 88. The node 84 is also connected to one side of a control capacitor 90. The first and second controllable current sources 86 and 88 are controlled by a time constant control signal 92. A first output 94 of a combined digital-to-analog converter and multiplexer 96 is connected through a momentary-closure switch 97 to the node 84 as well. A second output 98 of the combined digital-to-analog converter and multiplexer 96 is connected to the opposite side of the control capacitor 90. There are four inputs to the combined digital-to-analog converter and multiplexer 96. The first input is the initial read mode signal 100. The second input 102 is the read mode at equilibrium signal. The third input 104 is the initial write mode signal. The fourth input 106 is the write mode at equilibrium signal. The combined digital-to-analog converter and multiplexer is controlled by the R/-W signal 74 to provide either the first two inputs 100 and 102 to the outputs 94 and 98 or the last two inputs 104 and 106 to the outputs 94 and 98.

Figure 8:
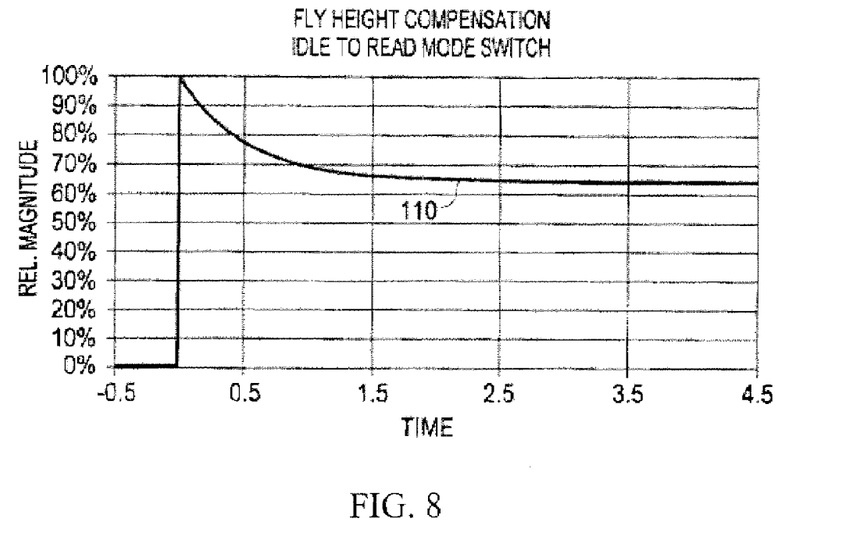
FIG. 8 illustrates a waveform of power dissipation in the heater during a transition from idle mode to read mode, according to the present invention.

Thus, in the case of a read event, power can be set at a level in excess of the final value in order to hasten reaching fly height equilibrium. The power can then be allowed to decay to a relatively lower final value (to overshoot and settle out) once equilibrium is reached. The same approach is followed if the read event follows a write event in which pole tip protrusion is manifest since the PTP is taken into account in selecting the appropriate overshoot target. FIG. 8 illustrates a waveform of the power that may be dissipated by the heater 64 during an idle-to-read mode switch. As can be seen, the dissipated power 110 switches nearly instantaneously from 0% magnitude to 100% magnitude at time 0. Due to the action of the capacitor, the power dissipation decays down to approximately 65% magnitude over time.

Figure 9:
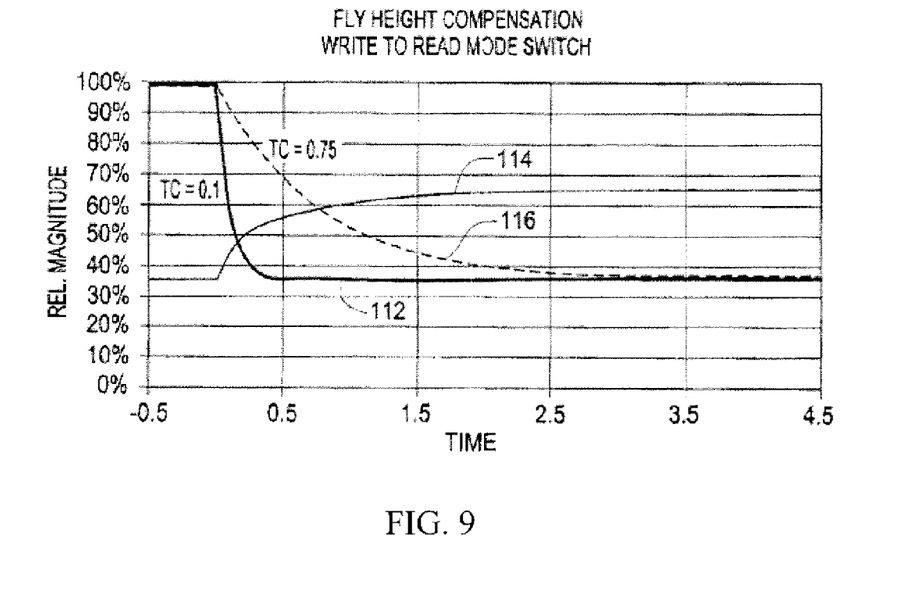
FIG. 9 illustrates waveforms of WPTP, power dissipation in the heater, and thermal actuation during a transition from write mode to read mode, according to the present invention.

If a read event immediately follows a write event, care must be taken to allow PTP to subside prior to approaching the read equilibrium fly height so as to avoid disk contact. This is illustrated in the waveforms of FIG. 9. In this case, the change in WPTP 112 can be seen to have a smaller time constant (faster transition) than the dissipated power 114 or the thermal actuation achieved 116.

Figure 10:
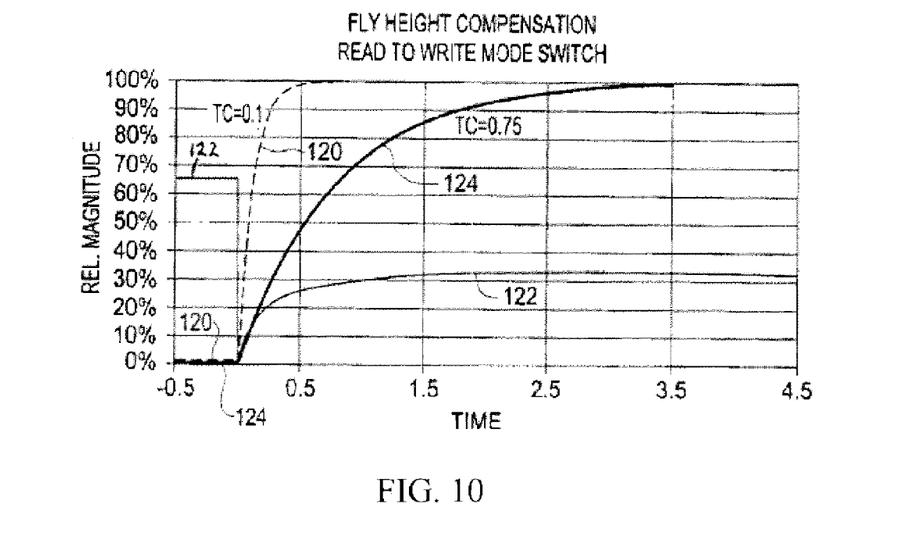
FIG. 10 illustrates waveforms of WPTP, power dissipation in the heater, and thermal actuation during a transition from read mode to write mode, according to the present invention.

In the case of a write event, power would begin at the nominal read equilibrium level, and then decrease with the time constant appropriate to compensate for any onset of PTP so that the head clearance changes inversely to PTP magnitude, leaving the head at a constant overall fly height. Again, this includes an overshoot to a minimum value and then settling out. This scenario, however, is likely to be complicated by the dissimilar time constant of fly height adjustment settling and PTP onset. More specifically, PTP reaches full potential much faster than the head's fly height response. It is hoped that establishing the power at a low value relative to read mode and then settling to a relatively higher value will result in a controlled and accelerated fly height stabilization compared to the alternative of a simple step adjustment of element power. This is illustrated in FIG. 10. If a step adjustment is used (i.e., without overshoot), the effect of PTP over the time it takes to become established will go uncompensated. It should be further noted that if there is no pole tip protrusion with a given head design, provision for zero compensation for this or any other item is possible by choosing an appropriate over/undershoot level which includes zero. To achieve the overshoot of power applied to the element, a pre-charge of the control source (e.g., the control capacitor or similar device) would occur on a mode switch to initialize the initial and equilibrium target. Equilibrium is achieved when an initial charge placed on the capacitor is removed by the current sources so that the voltage across the capacitor reaches zero. The polarity of the control source would determine the polarity of the voltage across the capacitor, which in turn would determine whether the driver output is to be ramped up or down, which is ultimately a result of the relative values held in the control registers. The register pair selected for the pre-charge is determined by which edge of the R/-W signal 74 occurs. A settling time constant can be set by programming the magnitude of the current sources that charge/discharge the control capacitor 90.

In an effort to overcome the limitations that the difference in the time constant for fly height adjust and PTP, it is possible to begin the fly height adjustment prior to the read/write mode change. Thus, the new fly height required could be anticipated, by virtue of a control signal that precedes the actual mode change. This would allow the new selected fly height to reach equilibrium prior to its use. A control signal other than the R/-W signal 74 would be required in this case, however.

A similar provision would be required when used with multi-head applications wherein the fly height of the next head/data will require actuation some amount of time before being selected. However, it is quite likely that the criteria in selecting overshoot, undershoot and target power levels and their associated time constants would be different than for switching coincident with mode change. In any case, the same control and driver apparatus could be used with the provision for extra control signals as is appropriate.

Furthermore, the addition of a temperature sensor would enhance the ability of the system to predict appropriate actuation levels over a wider range of operating temperatures. Due to the contributions of ambient temperature to both nominal fly height and PTP, knowing the current temperature would allow for the adjustment of target power levels In a like manner, a method to measure the resistance of the actuator element would also allow for target power level adjustment as a function of the element's resistance at the time of actuation. Such a sensor could be constructed by measuring the voltage at the point of current abrogation to the actuator, or vice-versa, by measuring the current at the point of voltage application.

Depending on the type of driver selected, it is possible that the actual profiles of power versus time delivered to the element will differ from those illustrated herein. Rather than continuously variable power being delivered to the element, a system that delivers discrete step levels that approximate the desired response could be easier and less costly to implement.

Figure 11:
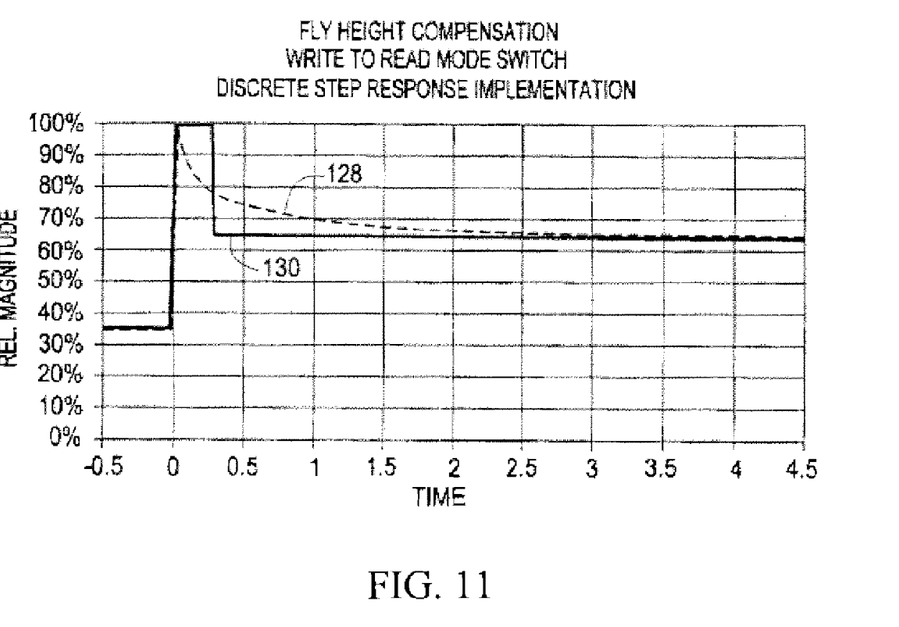
FIG. 11 illustrates waveforms of desired power dissipation in the heater and achieved power dissipation in the heater with a step function input, according to the present invention.

FIG. 11 illustrates the output of such a system. As can be seen, the desired power dissipation 128 by the heater is closely approximated by the step function power dissipation 130 by the heater.

Further detail on techniques for thermal actuation are disclosed in co-pending U.S. patent application Ser. No. 10/859,917 filed Jun. 3, 2004, entitled "Thermal Actuator Design for Hard Disk Drive Magnetic Recording". This co-pending application is owned by the Assignee of the present application and the entire contents are incorporated herein by reference.

The foregoing description of the present invention has been presented for purposes of illustration and description. It should be appreciated that the illustrations are not drawn to scale, for example. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method of operating read and write transducers in a disk drive system, the method comprising:
    providing a read/write head and an adjacent data storage disk for a disk drive system, the head having a read transducer, a write transducer, and a thermal actuator located therein, the head having a read mode of operation and a write mode of operation;
    driving the thermal actuator with electrical current to heat up the thermal actuator and portions of the head so that at least portions of the head expands and a distance between the head and the adjacent storage disk decreases; and
    controlling the thermal actuator for different levels of thermal actuation;
    detecting the mode of the read/write head;
    wherein a first level of thermal actuation is provided in response to the detection of a write mode, and a second level of thermal actuation, different from the first level of thermal actuation, is provided in response to the detection of a read mode.

2. A method as defined in claim 1, wherein the different levels of thermal actuation are achieved by causing the thermal actuator to dissipate different levels of power.

3. A method as defined in claim 2, wherein the different levels of power are achieved by controlling the current provided to the thermal actuator.

4. A method as defined in claim 2, wherein the different levels of power are achieved by controlling the voltage applied to the thermal actuator.

5. A method as defined in claim 1, wherein a current source driver is used.

6. A method as defined in claim 1, wherein a voltage source driver is used.

7. A method as defined in claim 1, wherein a hybrid driver having a feedback element is used.

8. A method as defined in claim 1, wherein a continuously variable amount of actuation by the thermal actuator is approximated by driving the thermal actuator with a series of step responses.

9. A method as defined in claim 1, wherein controlling comprises selecting one of multiple inputs for driving the thermal actuator based on the present operational mode of the disk drive system; wherein selecting is done by a multiplexer; and wherein there are at least two selectable inputs, one for a read mode and one for a write mode of the disk drive system.

10. A method as defined in claim 9, wherein one of multiple inputs comprises an initial value and an equilibrium value, and wherein one of the multiple inputs begins at the initial value and settles over time to the equilibrium value.

* * * * *

UNITED STATES PATENT AND TRADEMARK OFFICE
CERTIFICATE OF CORRECTION

PATENT NO. : 7,502,205 B1 Page 1 of 1
APPLICATION NO. : 10/859919
DATED : March 10, 2009
INVENTOR(S) : Hurtado et al.

It is certified that error appears in the above-identified patent and that said Letters Patent is hereby corrected as shown below:

Title Page item 56
At References Cited, please delete "6,104,577 A  *   8/2000   Kato et al. .....360/46" and insert --6,104,557   A  *   08/2000   Kasai et al.   ..... 360/46--

Signed and Sealed this

Fifth Day of May, 2009

JOHN DOLL
*Acting Director of the United States Patent and Trademark Office*